United States Patent [19]

Shapess

[11] Patent Number: 4,758,918

[45] Date of Patent: Jul. 19, 1988

[54] ADVANCED LATCHING CIRCUIT

[75] Inventor: Robert P. Shapess, Cato, N.Y.

[73] Assignee: SynderGeneral Corporation, Minneapolis, Minn.

[21] Appl. No.: 940,851

[22] Filed: Dec. 12, 1986

[51] Int. Cl.[4] ............................................ H02H 7/00

[52] U.S. Cl. .................................... 361/22; 361/156; 361/170; 361/194

[58] Field of Search ................ 361/22, 192, 193, 194, 361/156, 170

[56] References Cited

U.S. PATENT DOCUMENTS

| | | | |
|---|---|---|---|
| 3,387,188 | 6/1968 | Euler | 361/194 |
| 3,456,164 | 7/1969 | Sternberg | 361/194 |
| 4,291,359 | 9/1981 | Dieterle | 361/192 |

FOREIGN PATENT DOCUMENTS

| | | | |
|---|---|---|---|
| 0634391 | 11/1978 | U.S.S.R. | 361/194 |

*Primary Examiner*—A. D. Pellinen
*Assistant Examiner*—Jeffrey A. Gaffin
*Attorney, Agent, or Firm*—Richards, Harris, Medlock & Andrews

[57] ABSTRACT

An advanced latching circuit (14) is used for latching a compressor (16) to a power source (18). The circuit includes the solenoid (32) of a compressor relay. A first set of contacts (28) of the compressor relay, a capacitor (34) and a resistor (36) are connected in parallel with each other and in series with the solenoid (32). Power supplied to the latching circuit (14) with the capacitor discharged energizes the solenoid (32) and latches the circuit. The opening of the latching circuit (14) by a safety switch (38, 40) deenergizes the solenoid to disconnect the compressor from its power source and charges the capacitor (34). The solenoid cannot be reenergized to reactivate the compressor until service personnel remedy the heat pump malfunction and interrupt power to the latching circuit (14).

7 Claims, 1 Drawing Sheet

FIG. 1
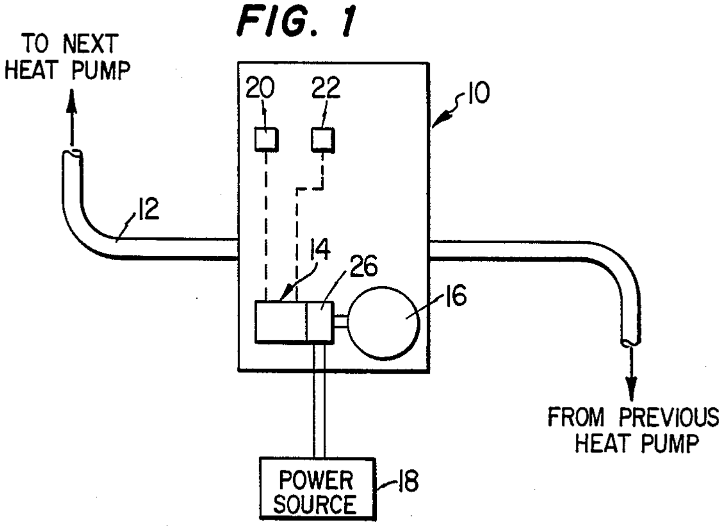
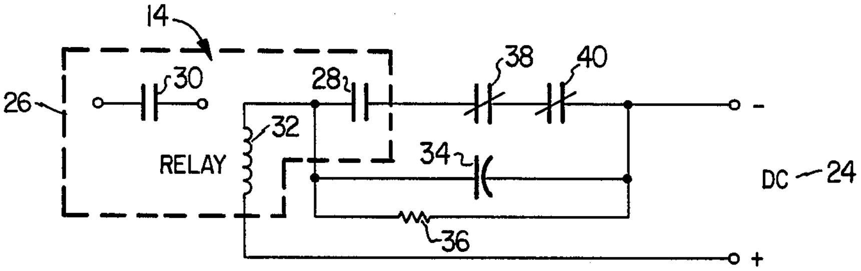
FIG. 2
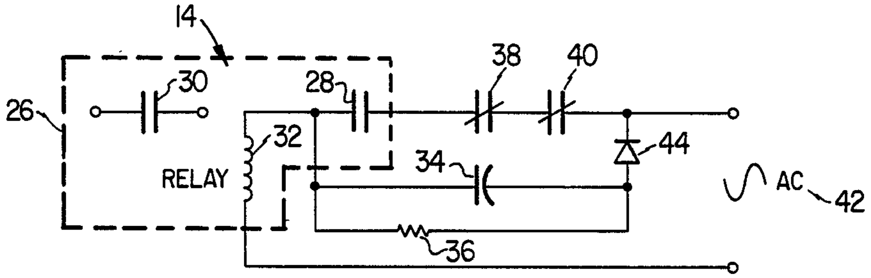
FIG. 3

ADVANCED LATCHING CIRCUIT

TECHNICAL FIELD

This invention relates to the control of a compressor, and in particularly to a compressor for use in a heat pump.

BACKGROUND OF THE INVENTION

In the air conditioning and heating of commercial buildings, water source heat pumps are effective devices for maintaining the desired temperature conditions throughout the building. Each area of the building will be conditioned by a separate heat pump, but all heat pumps are connected in a single water loop.

Even in the dead of winter, the presence of occupants and equipment, such as lights and typewriters, will often provide all the heat necessary to condition the building. However, areas near windows will require a greater portion of the heat to remain at the desired temperature, while core areas of the building may well need to have heat removed. The water source heat pumps satisfy this requirement by taking heat from the core areas and redistributing the heat through this continuous water loop to the heat pumps in the outside areas. Thus, the proper environmental conditions can often be maintained in the building for very low costs by simply transferring excess heat from one area to an area which requires supplemental heat.

Each water source heat pump contains a compressor run from an electrical power source. Safety monitoring circuits are required to insure that the compressor will be stopped if the heat pump malfunctions. For example, the compressed fluid may exceed a desired pressure or fall below a desired minimum temperature. Whatever the malfunction condition, the compressor must be disconnected from its power source and kept disconnected until repair personnel can determine the cause of the defect.

In order to satisfy these requirements, expensive conventional electromechanical relays have been used to lock out the compressor when a safety function is sensed. Such relays require a special matching circuit and special compressor contacts on the compressor, providing an expensive package. A need thus exists for a less expensive circuit for performing this function.

SUMMARY OF THE INVENTION

In accordance with one aspect of the present invention, an advanced latching circuit is provided for controlling the operation of a compressor by interrupting power to the compressor upon receipt of a safety signal. The latching circuit includes a compressor relay having first and second sets of contacts and a solenoid for closing the sets of contacts when energized and opening the sets of contacts when deenergized. The second set of contacts connect the compressor to its power source, either directly or through a compressor control circuit. The first set of contacts, a capacitor and a resistor are connected in parallel to each other and in series with the compressor relay solenoid. The capacitor is selected so that current flowing through the compressor relay solenoid when the capacitor is discharged energizes the compressor relay solenoid to close the first set of contacts to maintain energization of the compressor relay solenoid to latch the circuit. The safety signal interrupts current flow through the first set of contacts sufficiently to deenergize the compressor relay solenoid and charge the capacitor. The charge on the capacitor prevents reenergization of the compressor relay solenoid until the power source is removed from the latching circuit for a sufficient time period to discharge the capacitor across the resistor.

In accordance with another aspect of the present invention, an AC power source is employed and a diode is positioned in series with the capacitor and resistor to rectify the current flow to the capacitor.

BRIEF DESCRIPTION OF THE DRAWINGS

A more complete understanding of the invention and its advantages will be apparent from the following Detailed Description when taken in conjunction with the accompanying Drawings, in which:

FIG. 1 is a schematic view of a water source heat pump and latching circuity; and FIG. 2 is a circuit diagram forming a first embodiment of the present invention;

FIG. 3 is a circuit forming a second embodiment of the present invention.

DETAILED DESCRIPTION

Referring now to the drawings, wherein like reference characters designate like or corresponding parts throughout the several views, and in particular to FIG. 1, a water source heat pump 10 is illustrated. The water source heat pump 10 is positioned in a continuous water loop 12. In the typical application within a commercial building, a series of heat pumps 10 are positioned along the water loop 12 to transfer excess heat from certain areas to supplement other areas.

The water source heat pump 10 is provided with an advanced latching circuit 14 forming a first embodiment of the present invention. The purpose of the latching circuit 14 is to control the supply of power to the compressor 16 of the heat pump 10 from a power source 18 until a malfunction occurs in the heat pump 10. When such a malfunction is sensed, the latching circuit 14 will cause the compressor 16 to disconnect from the power source 18 and prevent reconnection until the power source is turned off by service personnel who determine the cause of the malfunction.

Typical malfunctions of heat pump 10 include an excess pressure, sensed by pressure sensor 20 and a low temperature condition, sensed by temperature sensor 22.

With reference now to FIG. 2, the details of the advanced latching circuit 14 will be discussed in greater depth. The latching circuit 14 is connected to a DC power source 24 which may be identical to power source 18, or a separate power source. A compressor relay 26 is provided which has a first set of contacts 28 forming part of the latching circuit and a second set of contacts 30 forming part of the circuit providing power to the compressor 16 from power source 18. Typically, contacts 30 will be in a compressor control circuit, which, in turn, would control the direct connection of the power source to the compressor. However, contacts 30 can be in the direct circuit between the power source and compressor if desired. Both sets of contacts are closed when compressor relay solenoid 32 is energized by current flow and the sets of contacts are separated when the solenoid is deenergized. As can be seen from FIG. 2, the first set of contacts 28 are positioned in circuit 14 in parallel to a capacitor 34 and a resistor 36. The first set of contacts 28, capacitor 34 and resistor 36 are all connected in series with the compressor relay solenoid 32. A pressure sensor safety switch 38 is connected in series with the first set of contacts 28 and a temperature sensor safety switch 40 is also connected in series with the first set of contacts 28. If pressure sensor 20 senses an excessive pressure condition, the safety switch 38 is opened. Similarly, if a low temperature condition is sensed by temperature sensor 22, the temperature sensor safety switch 40 is opened.

In operation, the power source 24 will initially be off. The solenoid 32 will be deenergized, opening the second set of contacts 30 to disconnect the compressor 16 from the power source 18. The capacitor 34 will be discharged and the safety switches 38 and 40 will be closed.

When DC power source 24 is activated, current will flow through the circuit 14, energizing the solenoid 32. The value of capacitor 34 is selected so that the current will continue to flow for a sufficient time period to allow the solenoid 32 to close the contacts 28 and 30 to latch the circuit. Once latched, i.e. with the first set of contacts 28 closed to maintain energization of the solenoid 32, the compressor is connected to the power source 18 through the second set of contacts 30 to operate the compressor. The capacitor will discharge across the relatively low resistance portion of the circuit containing the first set of contacts 28 and safety switches 38 and 40. The value of resistor 36 is selected to be high enough to resist significant current flow therethrough.

If a malfunction is sensed, either by pressure sensor 20 or temperature sensor 22, one of the safety switches 38 or 40 will open. The solenoid 32 will remain energized only for the period sufficient to charge the capacitor 34 as the resistance of resistor 36 is sufficiently high to prevent an energization current to flow solely through the resistor 36. Once charged, the capacitor 34 will prevent sufficient current from flowing through the circuit to maintain the solenoid 32 energized. When solenoid 32 is deenergized, both sets of contacts 28 and 30 will open, disconnecting the compressor 16 from the power source 18.

With the capacitor 34 charged, it will be impossible to reenergize solenoid 32 without interrupting the DC power source 24. Thus, the compressor 16 can only be reconnected to the power source 18 after repair personnel have interrupted the DC power source 24 during their examination of the heat pump to determine the cause of the malfunction. Once DC power source 24 is interrupted, the capacitor 34 will discharge across the resistor 36 and remain discharged. When DC power source 24 is again activated, the circuit can be relatched.

With reference to FIG. 3, a second embodiment of advanced latching circuit 14 is illustrated. Identical components common to both embodiments are identified by the same reference numeral. However, the second embodiment is operated from an AC power source 42. In order to function properly, a diode 44 is positioned in series with the capacitor 34 and resistor 36 to rectify current flow therethrough. The operation of the second embodiment is substantially identical to the first embodiment previously described.

In one circuit constructed in accordance with the present invention, a capacitor having a capacitance value of 100 microfarads, (mf) was used with a resistor having a resistance of 2.2K ohms. The compressor relay employed required approximately 0.02 seconds of current flow through the solenoid for closing of the first set of contacts.

Thus, it can be seen that the present invention provides an inexpensive and effective latching circuit for a heat pump compressor. However, it will be understood that the teachings of the present invention can be used with a latching circuit for other electrical devices.

Although several embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the scope and spirit of the invention.

I claim:

1. A latching circuit controlling the operation of a compressor by interrupting power to the compressor upon receipt of a safety signal, comprising:

a compressor relay having a first set of contacts and a second set of contacts, and a solenoid for closing said sets of contacts when energized and opening said sets of contacts when deenergized;

a capacitor;

a resistor;

the first set of contacts, the capacitor and the resistor being connected in parallel to each other and in series with the compressor relay solenoid; and the capacitor being selected so that current flowing through the compressor relay solenoid when the capacitor is discharged energizes the compressor relay solenoid to close the sets of contacts to maintain energization of the compressor relay solenoid to latch the circuit, the safety signal interrupting current flow through the first set of contacts sufficiently to deenergize the compressor relay solenoid and charge the capacitor, the charge on the capacitor preventing reenergization of the compressor relay solenoid until power is removed from the latching circuit for a sufficient time period to discharge the capacitor across the resistor.

2. The latching circuit of claim 1 wherein an AC power source is provided to the latching circuit, a diode being positioned in series with said capacitor and resistor to rectify current flow.

3. The latching circuit of claim 1 used in a water source heat pump.

4. The latching circuit of claim 1 wherein said safety signal comprises a safety switch in series with the first set of contacts, the switch opening upon receipt of the safety signal.

5. A latching circuit controlling the operation of a compressor by interrupting power to the compressor upon receipt of a safety signal, comprising:

a compressor relay having a first set of contacts and a second set of contacts, and a solenoid for closing said sets of contacts when energized and opening said sets of contacts when deenergized;

at least one normally closed safety switch which opens upon receipt of a safety signal;

a capacitor;

a resistor;

said first set of contacts, capacitor and resistor being connected in parallel to each other and in series with the compressor relay solenoid, said safety switch being connected in series with said first set of contacts; and the capacitance of said capacitor being selected so that current flowing through the compressor relay solenoid when the capacitor is discharged energizes the compressor relay solenoid to close said sets of contacts to maintain energization of the compressor relay solenoid to latch the circuit, the safety switch interrupting current flow through said first set of contacts when opened upon receipt of the safety signal sufficiently to deenergize said compressor relay solenoid and charge the capacitor, the charge on the capacitor preventing reenergization of said compressor relay solenoid until power is removed from the latching circuit for a sufficient time period to discharge the capacitor across the resistor.

6. The latching circuit of claim 5 wherein the power source to the latching circuit is alternating current, a diode being positioned in series with said capacitor and resistor for rectifying current flow therethrough.

7. The latching circuit of claim 5 wherein said second set of contacts are in a circuit connecting said compressor with a power source, the compressor operating from said power source only when the second set of contacts are closed.

* * * * *